United States Patent

[11] 3,565,375

| [72] | Inventor | Billy W. Babb |
| | | Campbell, Calif. |
| [21] | Appl. No. | 813,142 |
| [22] | Filed | Apr. 3, 1969 |
| [45] | Patented | Feb. 23, 1971 |
| [73] | Assignee | Robert R. Walker, Jr. |
| | | San Jose, Calif. |

[54] PLASTIC PIPE HANGER
6 Claims, 3 Drawing Figs.

[52] U.S. Cl. ................................................ 248/59,
248/63, 248/70, 248/74
[51] Int. Cl. ........................................ F16l 3/14,
F16l 9/12
[50] Field of Search ........................................ 248/74
(PB), 63, 73, 74, 59; 24/16 (PB), 73.7

[56] References Cited
UNITED STATES PATENTS

| 1,362,244 | 12/1920 | Farley | 24/73.7X |
| 3,090,826 | 5/1963 | Cochran | 248/74X |
| 3,054,585 | 9/1962 | Roberts | 248/74 |
| 3,273,837 | 9/1966 | Willert | 248/59 |
| 3,330,517 | 7/1967 | Zimmerman | 248/62 |
| 3,432,129 | 3/1969 | Santucci | 248/69 |

FOREIGN PATENTS

| 1,022,820 | 3/1966 | Great Britain | 248/74 |
| 1,464,801 | 11/1966 | France | 248/74 |
| 898,124 | 6/1962 | Great Britain | 24/73.7 |
| 1,097,256 | 1/1966 | Great Britain | 24/73.7 |

OTHER REFERENCES

Hill, IBM Technical Bulletin, date June 1959, Vol. 2 No. 1, Class 248— 74.

*Primary Examiner*—Chancellor E. Harris
*Attorneys*—Jack M. Wiseman and Thomas E. Schatzel ABSTRACT: A pipe hanger, constructed of a collar formed with an interstice and being bendable between a plurality of positions for engaging pipes of a plurality of sizes, respectively, the collar also being bendable between each pipe-engaging position and corresponding pipe-releasing position. Means are provided for releasably securing the collar in each pipe-engaging position. Means are further provided for suspending the collar from a support structure.

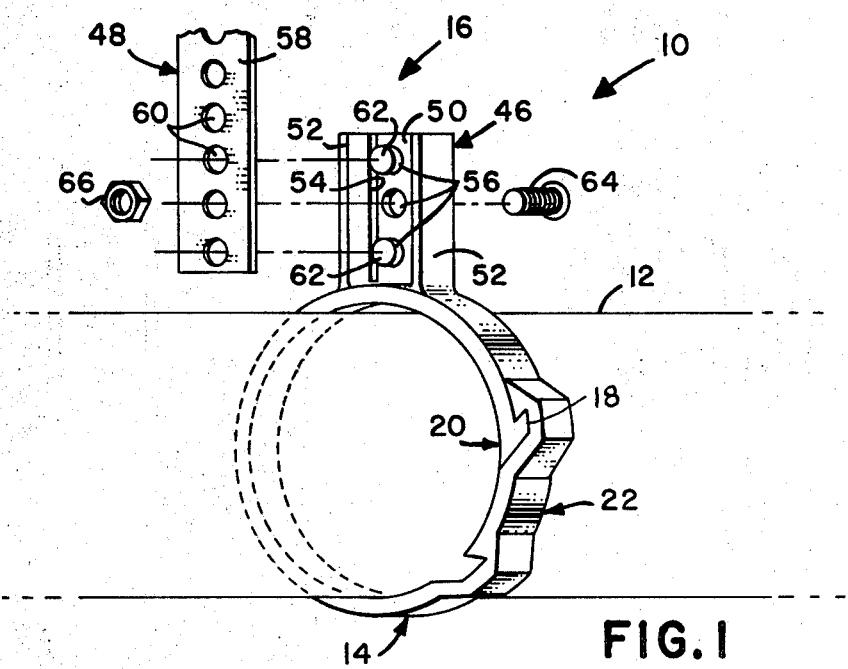
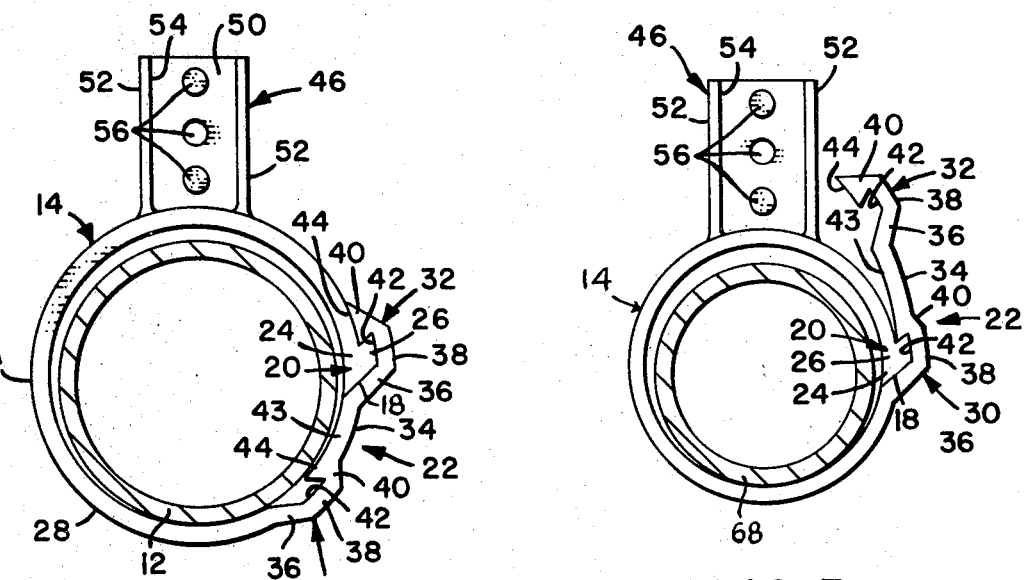
FIG.1
FIG.2
FIG.3
INVENTOR.
BILLY W. BABB
BY
ATTORNEYS

PLASTIC PIPE HANGER

BACKGROUND OF THE INVENTION

The present invention relates to hangers for piping, and more particularly to a hanger which is designed to suspend plastic piping of a plurality of sizes.

Plastic piping has come into increasing use in recent years, as a result of the numerous advantages offered thereby. Among such advantages of plastic piping are its unusually great flexibility, and its unusually great lightness in weight. Plastic piping has, however, also presented certain disadvantages. Such disadvantages have attended the installation of the piping, and the maintenance thereof in suitable installed position. Conventional types of pipe hangers have usually been employed for such installation and maintenance purposes. However, because of the lightness in weight of the plastic piping, it has often been necessary to secure the piping to the hanger employed, by utilization of an adhesive material. Such utilization of adhesive material has been inordinately costly and time-consuming.

Hangers have recently come into use, which have been particularly designed for the suspension of plastic piping. Many of these hangers has usually served to eliminate the necessity of utilizing an adhesive material for securing the plastic piping to the hanger. However, it has often been required to utilize an adhesive material, such as cement, for the purpose of installing the hanger itself; or to employ some other costly and time-consuming operation.

Many of the known hangers for plastic piping has usually been suitable for the suspension of only a single size of piping. The suspending of pipes of a number of different sizes has, therefore, required the use of hangers of a corresponding number of different sizes. A plastic pipe hanger of this general description has been disclosed by the applicant in a pending application, Ser. No. 783,977, filed Dec. 16, 1968 for Plastic Pipe Hanger.

SUMMARY OF THE INVENTION

The present invention provides a pipe hanger, the use which hanger serves to overcome the problems existing in the prior art with respect to the suspension of plastic piping, such as have been discussed hereinabove. The employment of the hanger of the invention obviates the use of an adhesive material for installation purposes. The hanger of the invention is, therefore, installed in pipe-supporting position comparatively rapidly and comparatively cheaply. The hanger of the invention, furthermore, readily receives a pipe to be suspended thereby. In addition, such hanger securely supports a pipe suspended thereby, without requiring the use of an adhesive material. The hanger of the invention, furthermore, may be employed to support pipes of a plurality of sizes. The advantages provided by the hanger of the invention are achieved by use of mechanical means for installation of the hanger; and for securing the pipe to the hanger.

BRIEF DESCRIPTION OF THE DRAWINGS

The advantages of the present invention will become apparent to one skilled in the art, from the following description, when read in conjunction with the accompanying drawings, in which:

FIG. 1 is a perspective view, being somewhat diagrammatic, of a pipe hanger constructed in accordance with the invention, a strap portion of the hanger being shown disassembled from the remainder of the hanger, a pipe being shown suspended by such hanger.

FIG. 2 is an end-elevational view of a collar and mounting member included in the pipe hanger of FIG. 1 a pipe suspended thereby being shown in cross section; and FIG. 3 is a view similar to FIG. 2, a pipe of reduced diameter being shown suspended by the pipe hanger.

DESCRIPTION OF THE PREFERRED EMBODIMENT

Referring to the drawings, and particularly to FIG. 1, there is shown a pipe hanger 10 of the invention. The hanger 10 is designed to suspend a plastic pipe 12 from a suitable conventional supporting surface (not shown). The hanger 10 is constructed of a somewhat flexible plastic material, such as, e.g., acrylonitrile-butadiene-styrene.

The pipe hanger 10 provides a collar 14, and a suspension assembly 16. The collar 14 (see also FIGS. 2 and 3) is formed with an interstice 18. Opposite the interstice 18, the collar 14 is provided with a stressed portion A.

The collar 14, at the opposite sides of the interstice 18, is formed with two interlockable closure members 20 and 22, respectively. The member 20 is hook-shaped, being formed of a segment 24 of the collar 14, located adjacent the interstice 18; and a flange 26 which is integral with the collar 14, and extends angularly to the peripheral surface 28 of the latter.

The member 22 provides two locking portions 30 and 32, which are spaced apart by a connector portion 34. Each of the locking portions 30 and 32 is hook-shaped, being constructed of an inner leg 36, and intermediate leg 38, and an outer leg 40. Each set of legs 36, 38, 40 defines a recess 42 shaped to receive the flange 26. The connector portion 34 is curved, so as to provide an inner surface 43 engageable with the peripheral surface 28 of the collar 14. The distal end surface 44 of each leg 40 is likewise curved for engagement with the surface 28.

The suspension assembly 16 includes a mounting member 46, and a suspension strap 48. The mounting member 46 is constructed of plastic material, and is integral with the collar 14. The member 46 provides a generally rectangular base wall 50. Projecting from one face of the wall 50, and located at the opposite ends of the latter, respectively, are a pair of parallel-extending flanges 52, which define a recess 54. Extending through the wall 50 are three centrally-located apertures 56.

The suspension strap 48 is constructed of flexible plastic material, and is in the form of a flat band 58. The band 58 is dimensioned to fit within the recess 54 of the mounting member 46. A plurality of apertures 60 extend through the band 58, being positioned along the longitudinal center line thereof. The lowermost three of the apertures 60 are registerable with the three apertures 56 in the base wall 50 of the mounting member 46, respectively.

A pair of pins 62, or other conventional attachment members are provided for passage through the uppermost and lowermost of the apertures 56, respectively. A conventional bolt is provided for passage through the central aperture 56. Cooperating with the bolt 64 is a conventional nut 66.

In the use of the hanger 10, the suspension strap 48 is initially secured to a suitable support surface (not shown) by a pair of pins, or other conventional attachment members (not shown), which pass through two adjacent apertures 60. Any pair of apertures, except the three lowermost apertures 60 may be chosen, depending upon the height at which it is desired that the collar 14 be positioned. The mounting member 46 is then placed in a position for engagement of the lower end portion of the strap 48, and so that the latter lies within the recess 54. The apertures 56 of the member 46 are then brought into registration with the lowermost three apertures 60 of the strap 48. The pins 62 and bolts 64 may then be employed for securing the member 46 to the strap 48. The fit between the pins 62 and the apertures 60 are sufficiently tight to make the need of the bolt 64 and nut 66 optional.

The collar 14 may then be moved into an open position (not shown), in which the closure member 22 is disengaged from the closure member 20. Such movement is facilitated by the provision of the stressed portion A. The pipe 12 may then be inserted within the collar 14, and the latter moved into the closed position shown in FIGS. 1 and 2, in which the locking portion 32 of the closure member 22 engages the flange 26 of the closure member 20. The distal surface 44 of each leg 40 will then engage the peripheral surface 28 of the collar 14, as will the inner surface 43 of the connector portion 34. The pipe 12 will then be securely mounted within the collar 14.

If desired, the mounting member 46 may be reinforced by the insertion of a steel plate, or the like, within the recess 54.

In the dismounting of the pipe 12, the closure member 22 is disengaged from the closure member 20, and the collar 14 moved into an open position. The pipe 12 may then readily be removed from the collar 14.

If it is desired to employ the hanger 10 for support of a pipe of lesser diameter than the pipe 12, the collar 14 is initially moved into open position in the manner previously described. A pipe 68, being of lesser diameter than the pipe 12, is then inserted within the collar 14 (see FIG. 3). The collar 14 is then moved into the closed position shown in FIG. 3, in which the locking portion 30 of the closure member 22 engages the flange 26 of the closure member 20. The pipe 68 will then be securely mounted within the collar 14.

The pipe 68 may be dismounted from the hanger 10, in the same manner as previously described for the dismounting of the pipe 12.

It will thus be seen that the member 46 is secured to the strap 48, and that the collar 14 is maintained in either of the two closed positions thereof shown in FIGS. 2 and 3, respectively, without the use of an adhesive material.

It will be clear that a plurality of the hangers 10 will be required for support of a pipe 12 or a pipe 68, as in the case of conventional pipe hangers.

I claim:

1. A hanger for pipe comprising:
   a flexible unitary collar formed with an interstice and being adapted for bending between a plurality of positions for engaging pipes of a plurality of sizes, said collar being formed with a cylindrical inner wall, said collar being further adapted for bending between each pipe-engaging position and a corresponding pipe-releasing position, said collar further including interlock means for releasably securing said collar in each pipe-engaging position, the means including an integral protrusion adjacent one side of the interstice and a plurality of recesses spaced apart along the collar with one recess adjacent the other side of the interstice, said recesses each adapted to interlock with said protrusion in contour conforming mating relation for maintaining the inner wall of said collar cylindrical; and
   a mounting member integral with and projecting radially outward from the collar, the mounting member adapted to engage means for suspending the collar from a support structure.

2. A hanger in accordance with claim 1, in which the protrusion is hook-shaped and the recesses are hook-shaped.

3. A hanger for pipe comprising:
   a flexible unitary collar formed with an interstice and being adapted for bending between a plurality of positions for engaging pipes of a plurality of sizes, said collar being further adapted for bending between each pipe-engaging position and a corresponding pipe-releasing position, said collar further including interlock means for releasably securing said collar in each pipe-engaging position, the means including an integral protrusion adjacent one side of the interstice and a plurality of recesses spaced apart along the collar with one recess adjacent the other side of the interstice, said recesses each adapted to interlock with said protrusion; and
   a mounting member integral with the collar, the mounting member adapted to engage means for suspending the collar from a support structure, the protrusion is hook-shaped and the recesses are hook-shaped, said protrusion includes three exterior leg surfaces with first and second leg surfaces interconnected by a third surface, said first and second surfaces being substantially parallel relative to one another.

4. A hanger in accordance with claim 3, in which each of said hook-shaped recesses is defined by an inner leg surface, an intermediate leg surface and an outer leg surface, said leg surfaces forming three interconnected surfaces within the recess adapted to be complementary with and interlock with the first, second and third surfaces of said protrusion.

5. A hanger for pipe comprising:
   a flexible unitary collar formed with an interstice and being adapted for bending between a plurality of positions for engaging pipes of a plurality of sizes, said collar being formed with a cylindrical inner wall, said collar being further adapted for bending between each pipe-engaging position and a corresponding pipe-releasing position, said collar further including interlock means for releasably securing said collar in each pipe-engaging position, the means including an integral protrusion adjacent one side of the interstice and a plurality of recesses spaced apart along the collar with one recess adjacent the other side of the interstice, said recesses being adapted to interlock with said protrusion in contour conforming mating relation for maintaining the inner wall of said collar cylindrical; and
   a mounting member integral with and projecting radially outward from the collar, the mounting member adapted to engage means for suspending the collar from a support structure, the mounting member projects radially from the outer periphery of the collar and spaced angularly from said interstice, said mounting member forming a recess for receiving a suspension strap and carrying pin means for interlocking with apertures of the suspension strap.

6. A hanger in accordance with claim 5, in which the mounting member further includes an aperture adapted for alignment with an aperture of the strap and further adapted for receiving an attachment member interlocking the strap and mounting member.